United States Patent
Gallant et al.

(10) Patent No.: US 9,774,632 B2
(45) Date of Patent: Sep. 26, 2017

(54) MANAGEMENT AND DISTRIBUTION OF SECURITY POLICIES IN A COMMUNICATION SYSTEM

(71) Applicant: TrustPoint Innovation Technologies, Ltd., Campbellville (CA)

(72) Inventors: Robert Philip Gallant, Corner Brook (CA); Robert John Lambert, Cambridge (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 0 days.

(21) Appl. No.: 14/665,733

(22) Filed: Mar. 23, 2015

(65) Prior Publication Data

US 2015/0271208 A1    Sep. 24, 2015

Related U.S. Application Data

(60) Provisional application No. 61/969,634, filed on Mar. 24, 2014.

(51) Int. Cl.
*H04L 29/06* (2006.01)
*H04L 9/32* (2006.01)
(Continued)

(52) U.S. Cl.
CPC .......... *H04L 63/20* (2013.01); *G06F 9/45558* (2013.01); *H04L 9/3247* (2013.01);
(Continued)

(58) Field of Classification Search
None
See application file for complete search history.

(56) References Cited

U.S. PATENT DOCUMENTS 7,743,121 B2 *   6/2010   Boscovic .............. H04W 88/06
                                                          709/221
8,949,929 B2 *   2/2015   Kelly ...................... G06F 21/53
                                                          455/410

(Continued)

OTHER PUBLICATIONS

Huang, N.; International Search Report from corresponding PCT Application No. PCT/CA2015/050224, search completed May 29, 2015.

*Primary Examiner* — Hadi Armouche
*Assistant Examiner* — Andrew Steinle
(74) *Attorney, Agent, or Firm* — Brett J. Slaney; Blake, Cassels & Graydon LLP

(57) ABSTRACT

A system and method are provided for having a device in a communication system update an operational policy for the device by encoding a policy update in a virtual machine language used by a virtual machine on the device, having the policy update signed by a trusted entity, and sending a message comprising the signed policy update to the device to enable the device to implement the policy update using the virtual machine on the device. A system and method are also provided for updating an operational policy on a device in a communication system by receiving, at the device, a message comprising a signed policy update that has been signed by a trusted entity, the policy update being encoded in a virtual machine language used by a virtual machine on the device, verifying the signed policy update, and implementing the policy update using the virtual machine on the device when the policy update is verified.

31 Claims, 9 Drawing Sheets

(51) Int. Cl.
*G06F 9/455* (2006.01)
*G06F 9/445* (2006.01)
(52) U.S. Cl.
CPC ............ *H04L 9/3268* (2013.01); *H04L 63/06* (2013.01); *H04L 63/0823* (2013.01); *H04L 63/108* (2013.01); *G06F 9/44505* (2013.01); *G06F 2009/45587* (2013.01); *H04L 63/045* (2013.01)

(56) References Cited

U.S. PATENT DOCUMENTS

| | | | | |
|---|---|---|---|---|
| 2007/0288989 | A1* | 12/2007 | Aarnos | G06F 21/53 726/1 |
| 2010/0217853 | A1* | 8/2010 | Alexander | H04L 63/20 709/223 |
| 2012/0204032 | A1* | 8/2012 | Wilkins | H04L 9/006 713/170 |
| 2013/0291055 | A1* | 10/2013 | Muppidi | H04L 63/20 726/1 |

* cited by examiner

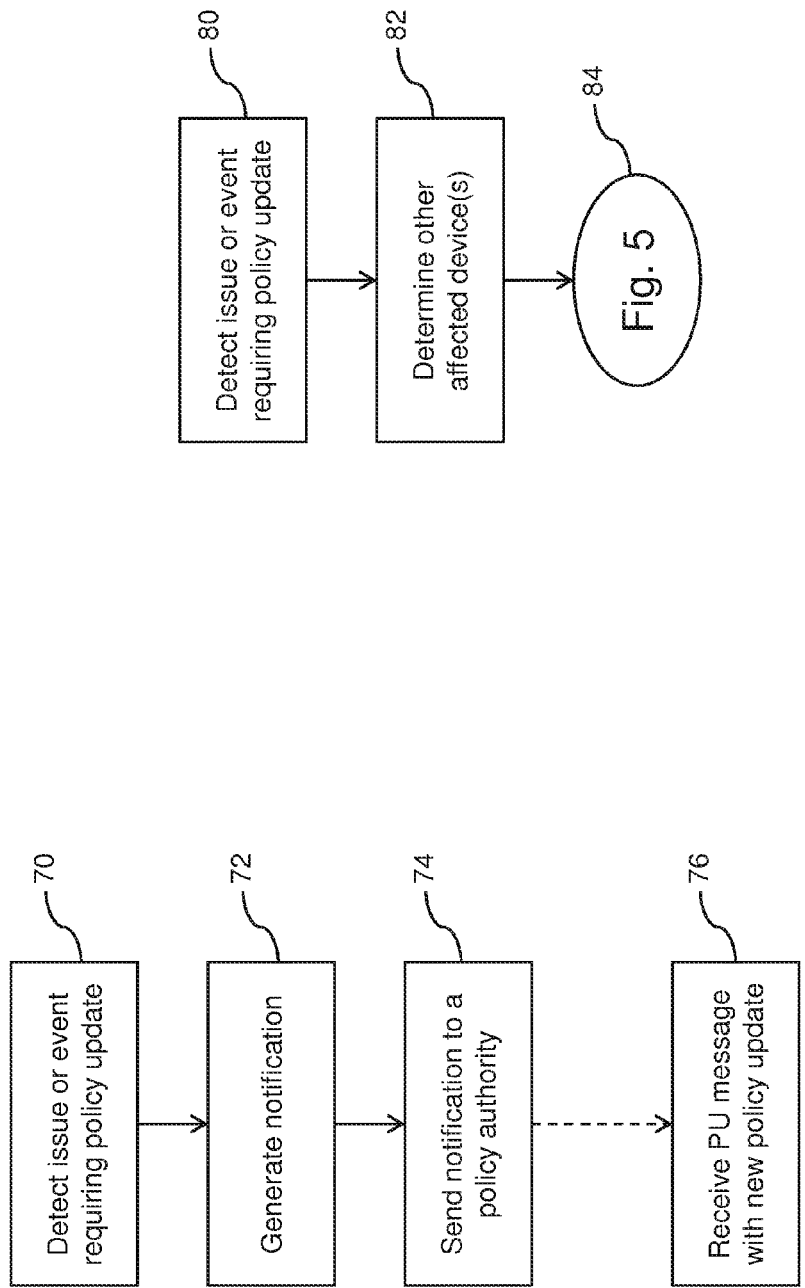

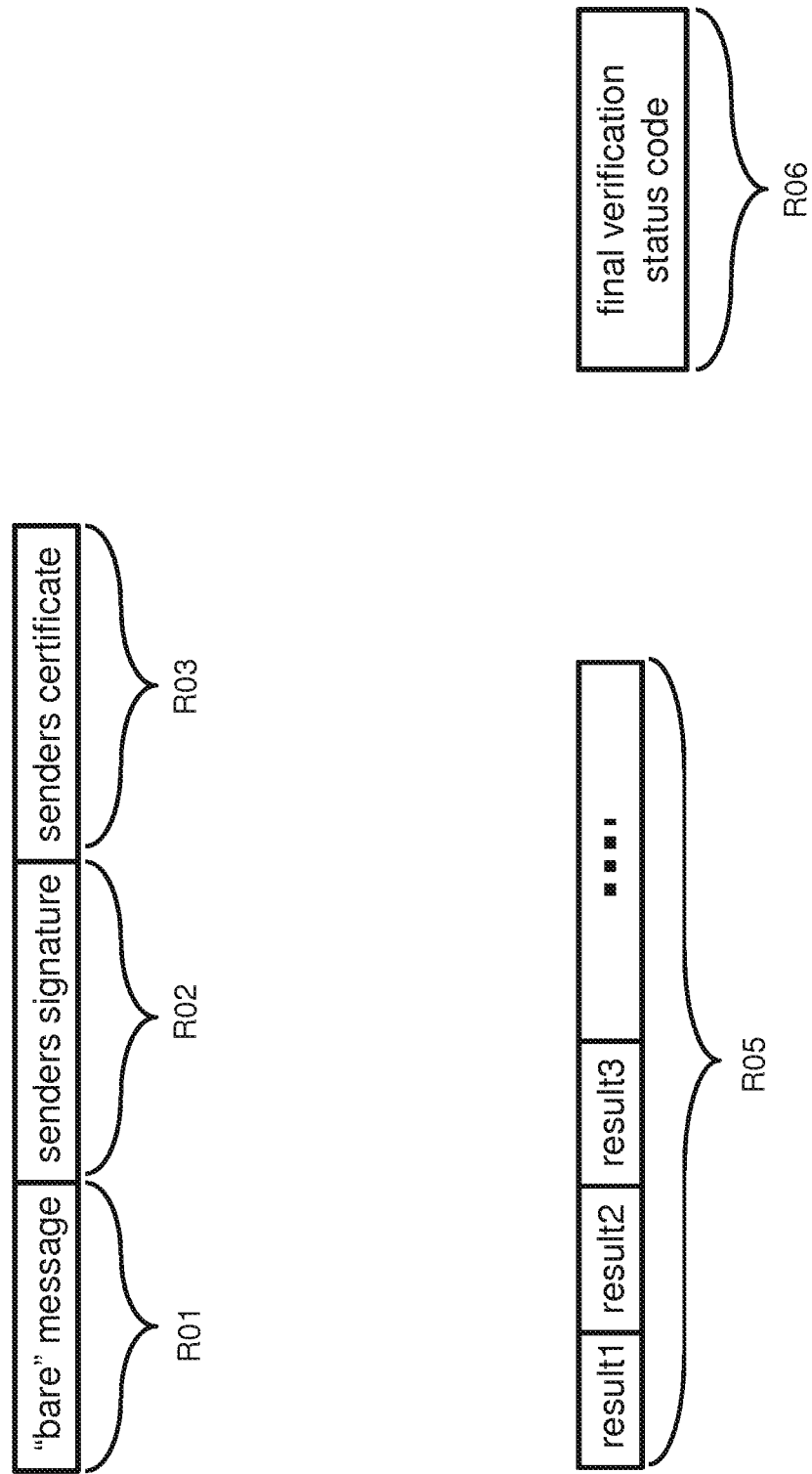

MANAGEMENT AND DISTRIBUTION OF SECURITY POLICIES IN A COMMUNICATION SYSTEM

This application claims priority from U.S. Provisional Application No. 61/969,634 filed on Mar. 24, 2014, the entire contents of which are incorporated herein by reference.

TECHNICAL FIELD

The following relates to the management and distribution of security policies in a communication system secured using public key certificates.

BACKGROUND

Since its invention, public-key cryptography techniques have been increasingly used to protect communications. In a typical scenario, a system of devices communicate over a network to exchange data between the devices. The network may be defined by dedicated telecommunication lines, or by a restricted access network within an organisation or by a public network accessible to all. The communication links of the network may be established by hard-wired connections or may be wireless or may be a combination of such links. Such networks are frequently used to transfer sensitive confidential information; and some adversaries external to the system may try to subvert or compromise the system by masquerading as a system entity, manipulating system messages, obtaining the secrets of one or more existing entities, etc. Public key cryptography involves assigning to each system entity secret data, called a 'private key' and corresponding public data, called a 'public key' which can be used to help secure communicated messages. Entities may have several such sets of keys for use in various techniques and for various purposes.

Many public-key cryptographic techniques can be employed to protect messages. For example, the sender of a message can create a digital signature on a message. A recipient of the message and the associated digital signature can use the public key of the sender and the digital signature to authenticate the message and to detect modification of the message by an adversary. This verification process requires the public key of the sender, so the recipient should be assured of the authenticity of the sender's public key before relying on the result of the verification. Digital signatures also provide for non-repudiation of messages, meaning the signor cannot subsequently disclaim the signature, which is important in some systems.

Having assurance that a given public key is authentic is important for cryptographic procedures other than digital signature verification. For example, before encrypting a message to a user "Alice", using Alice's (presumed) public key, and a corresponding public key encryption protocol, the sender should ensure that the public key is an authentic copy of Alice's public key (and not, for example, a public key created by an adversary trying to masquerade as Alice).

The same is true if, instead of encrypting a message to Alice, a shared key is established through a key-agreement protocol with her. Key-agreement protocols allow a sender and a recipient to establish a shared key using the private key of one entity and the public key of the other entity. The sender can then encrypt (using fast symmetric-key protocols) a message so that it is intelligible only to the intended receiver. Again, the authenticity of the recipient's public key is critical to the security of this process.

In large systems it is not always feasible for every device to store the public key of every other device, so when system entities want to communicate with each other using public key protocols, they must somehow obtain authentic copies of each other's public keys. If system entities agree to trust a distinguished system entity known as a Certificate Authority (CA), this problem of obtaining authentic public keys can be solved using Digital Certificates. The primary role of the CA is in specifying the current members of the system at any given time. To do this the CA issues Digital Certificates to system entities. Digital Certificates are documents, signed by the CA, that bind an identified system identity to a particular public key, so that the public key associated with that identity can be authentically determined. The document to be signed, usually referred to as the pre-signature or to-be-signed certificate, will often include additional information, such as a certificate serial number, the validity period of the certificate, e.g. time of issue and time of expiry, and supplementary information identifying the protocols and parameters to be used. When the information is assembled, the CA signs it. The to-be-signed certificate along with its signature is referred to as the end-entity certificate, or simply certificate. In very large systems the CA may delegate this work to sub-certificate authorities (also referred to as delegates or deputies), who will be identified as such in their certificates.

In such systems every entity has an authentic copy of the public key of the CA and so can verify signatures created by the CA. Hence when a system entity receives a certificate from another system entity they can use the CA public key to verify the CA's signature and thereby verify the authenticity of the public key contained in it. Thus the CA's digital signatures, used to create entity certificates in this manner, solves the problem of distributing authentic public keys to other system entities.

In such a system, an entity identified as Alice, say, can send a message M to other system entities, and they can be assured that a received message claimed to be from Alice did actually originate from her. A typical protocol would have Alice digitally sign a message M to create signature sig_A. The signature sig_A is generated using Alice's private key corresponding to her public key, Pub_A, whose authenticity is assured by a certificate, Cert_A, issued by the CA binding Alice's identity to her public key. Alice may send [M, sig_A, Cert_A] to her peers. Her peers use Cert_A and the Certificate Authority public key and predefined computations and logic encoded in the hardware or software of their device to confirm that the public key Pub_A contained in Cert_A is considered valid for use and is indeed Alice's.

If Alice's public key is considered valid for use, the message M, the signature, Sig_A, and this public key Pub_A, are processed by predefined rules and logic encoded in the hardware or software of the peer device to determine if the signature, Sig_A, is valid. If the signature is valid, the message is interpreted as truly coming from Alice. Similarly, in other cryptographic protocols requiring authenticity of public keys, such as public key encryption or key-exchange, entity certificates can be used as part of the protocol to establish authenticity of entity public keys.

A problem in systems of the above type is that the adversary may be capable of compromising a system entity, say Alice, to varying degrees. For example an adversary may be capable of tricking Alice into signing messages in a way that is detrimental to the rest of the system. Or perhaps the adversary is capable of determining Alice's private key and can therefore forge perfect versions of Alice's signature on arbitrary messages.

Once a compromised individual like Alice is detected, a CA has the option of declaring Alice a non-member of the system by 'revoking' her certificate. The process by which the CA typically revokes Alice's certificate may involve the use of a Certificate Revocation List, or CRL. A CRL is another type of structured document signed by the CA. The normal structure is, for example, a list of serial numbers, some bits indicating one or more predefined conditions apply to the serial number in question, a date or version and possibly other identifying information about the CRL itself, and a signature on the document by the Certificate Authority or another entity authorized to sign a CRL. The CA revokes Alice's certificate by listing her certificate's serial number on a CRL issued by the CA. Systems using CRLs for revocation often include, as part of the predefined process for checking authenticity of a certificate, a phase where the serial number of the certificate in question is confirmed to not be listed in the most current CRL available.

CRLs may offer limited control. Initially, a system entity has a private key and associated certificate and has not had its certificate revoked. In this case messages signed by the entity will be accepted as valid by an entity provided they pass the predefined checks embodied in each entity's logic, and provided the entity's certificate has not been listed on a CRL obtained by the validating entity. Once a system entity is revoked no message henceforth created by the entity should be accepted by the system.

Validating entities are encouraged to frequently obtain updated versions of the system CRL. In some cases the CRL may be transmitted to the system entities, but more typically, the CRL is made available to system entities for individual queries. The checking of the CRL requires the entity to review the entire list of revoked certificates to ensure that the certificate received is not on the list. Maintenance of the list may also be complex, particularly when an entity can have more than one certificate, or when the certificates of a group of entities have to be revoked. In that case, it is necessary to identify each of the certificates and ensure the serial number of each is listed on the next CRL issued by the CA.

Another existing method of determining whether the certificate associated with an entity is valid is as follows. The CA or another authorized entity operates a service, such as the Online Certificate Status Protocol (OCSP) in which entities in the process of validating a message can query the service about the revocation status of a given certificate. In some OCSP services, called 'OCSP stapling', an entity can use the service to obtain a time stamped message from the CA or another authorized entity stating that their certificate is unrevoked, which can then be attached and forwarded along with the certificate. In each case system entities are in direct two-way communication with the CA or its deputies.

A simple but representative example of a method for protecting system messages in the above framework is as follows. Suppose a company manufactures autonomous surveillance drones. During manufacturing, these drones obtain a private key and an associated certificate issued by the CA. In addition, the drones are installed with predefined hardware or software logic that protects and validates messages between system entities. On receipt of an incoming communication that will include a message, such as data indicating a new surveillance target for a drone, a digital signature of that message by the sender, and the certificate issued by the CA that authenticates the public key of the presumed sender of the message, the predefined software or hardware logic in the drone verifies the digital signature on the message using the public key in the certificate, and also determines whether the certificate contains a valid signature using the CA's public key, and that the certificate has not expired. The drone may itself try to obtain a recent CRL or one may be provided in the received communication. If a CRL is available the predefined logic verifies the CA's signature on the CRL and also checks whether the received certificate has been listed as revoked in the CRL. There may be some other predefined checks in the process of validating a chain of certificates such as, for example, confirming that policy identifiers in the received certificate conform to a predetermined value that distinguishes the drone system from other systems that the CA may administer. Such predetermined checks can become quite complicated as they often embody policy decisions about the system, which can become more complicated as the system grows.

For a number of reasons it may be difficult to modify the predefined hardware or software logic in a drone once it has left the manufacturing line. Reasons can include the need for specialized tools, the fact that the drone may be operational and regulatory or safety requirements may prevent such modifications during an operational phase, or the fact that such modifications may require the physical replacement of logic parts embodied in ROM or other hardware. In such situations the methods of protecting system messages are restricted to only those techniques considered up to the point of manufacture of the drone. These difficulties in updating control software (or hardware) are not restricted to the case of drones, but apply in many other situations where code and systems are difficult to update, owing to the fact that these have been subject to certification or audit, are critical safety systems which have undergone extensive validation and should not be changed, or due to the technology used to implement these control systems, which may have components in ROM or other technology which is difficult to change in the field.

A common complaint about current systems of this sort is their complexity, in particular with regards to the parsing and interpretation of the various certificate information in the process of validating a certificate chain for a large system. Moreover, using CRLs typically add significant overhead to the processing of communications, adding significantly to the maintenance of the communication system. In spite of the overhead introduced by using them, traditional CRLs are relatively inflexible in their ability to describe the conditions under which a certificate may be revoked. Also CRLs are used to help determine whether a given certificate is to be considered valid, where in general entities of the system should actually be concerned about whether the inbound communications as a whole, and in particular if the underlying message should be considered valid. In addition to basic policy decisions which concern the validity of certificates and the messaging protected by digital signatures associated with these certificates, the update of any policy in fielded equipment is currently difficult, especially in those cases where underlying components have been certified or highly tested and validated, or where the technology used to implement these policies is somewhat inflexible.

It is therefore an object of the following to address and/or mitigate the above disadvantages.

SUMMARY

The following describes a system for providing a controlled environment for dynamically modifying and distributing security system policies.

In one aspect, there is provided a method of having a device in a communication system update an operational policy for the device, the method comprising: encoding a policy update in a virtual machine language used by a virtual machine on the device; having the policy update signed by a trusted entity; and sending a message comprising the signed policy update to the device to enable the device to implement the policy update using the virtual machine on the device.

In another aspect, there is provided a computer readable medium comprising computer executable instructions for having a device in a communication system update an operational policy for the device, the computer executable instructions comprising instructions for: encoding a policy update in a virtual machine language used by a virtual machine on the device; having the policy update signed by a trusted entity; and sending a message comprising the signed policy update to the device to enable the device to implement the policy update using the virtual machine on the device.

In another aspect, there is provided a system for having a device in a communication system update an operational policy for the device, the system comprising a processor and memory, the memory comprising computer executable instructions for: encoding a policy update in a virtual machine language used by a virtual machine on the device; having the policy update signed by a trusted entity; and sending a message comprising the signed policy update to the device to enable the device to implement the policy update using the virtual machine on the device.

In another aspect, there is provided a method of updating an operational policy on a device in a communication system, the method comprising: receiving, at the device, a message comprising a signed policy update that has been signed by a trusted entity, the policy update being encoded in a virtual machine language used by a virtual machine on the device; verifying the signed policy update; and implementing the policy update using the virtual machine on the device when the policy update is verified.

In another aspect, there is provided a computer readable medium comprising computer executable instructions for updating an operational policy on a device in a communication system, the computer executable instructions comprising instructions for: receiving, at the device, a message comprising a signed policy update that has been signed by a trusted entity, the policy update being encoded in a virtual machine language used by a virtual machine on the device; verifying the signed policy update; and implementing the policy update using the virtual machine on the device when the policy update is verified.

In another aspect, there is provided a system for updating an operational policy on a device in a communication system, the system comprising a processor and memory, the memory comprising computer executable instructions for: receiving, at the device, a message comprising a signed policy update that has been signed by a trusted entity, the policy update being encoded in a virtual machine language used by a virtual machine on the device; verifying the signed policy update; and implementing the policy update using the virtual machine on the device when the policy update is verified.

In another aspect, there is provided a method of triggering a policy update for at least one device in a communication system, the method comprising: detecting an issue or event requiring an operational policy update; sending a notification to a policy authority to have a policy update generated; and receiving, at the device, a message comprising a signed policy update that has been signed by a trusted entity, the policy update being encoded in a virtual machine language used by a virtual machine on the device.

In another aspect, there is provided a method of updating an operational policy in a communication system, the method comprising: detecting, at a first device, an issue or event requiring an operational policy update; determining at least one other device in the communication system to be updated; encoding a policy update in a virtual machine language used by a virtual machine on the at least one other device; having the policy update signed by a trusted entity; and sending a message comprising the signed policy update to the at least one other device to enable the at least one other device to implement the policy update using the virtual machine on the at least one other device.

BRIEF DESCRIPTION OF THE DRAWINGS

Embodiments will now be described by way of example, with reference to the accompanying drawings, in which:

FIG. 7A is a representation of the steps involved in generating a notification of an issue or event detected in a network of devices;

FIG. 7B is a representation of the steps involved in generating a PU-script at a device in a network of devices;

FIG. 10 is a representation of a secured message as interpreted by a receiving entity of the system; and

DETAILED DESCRIPTION

Figure 1:
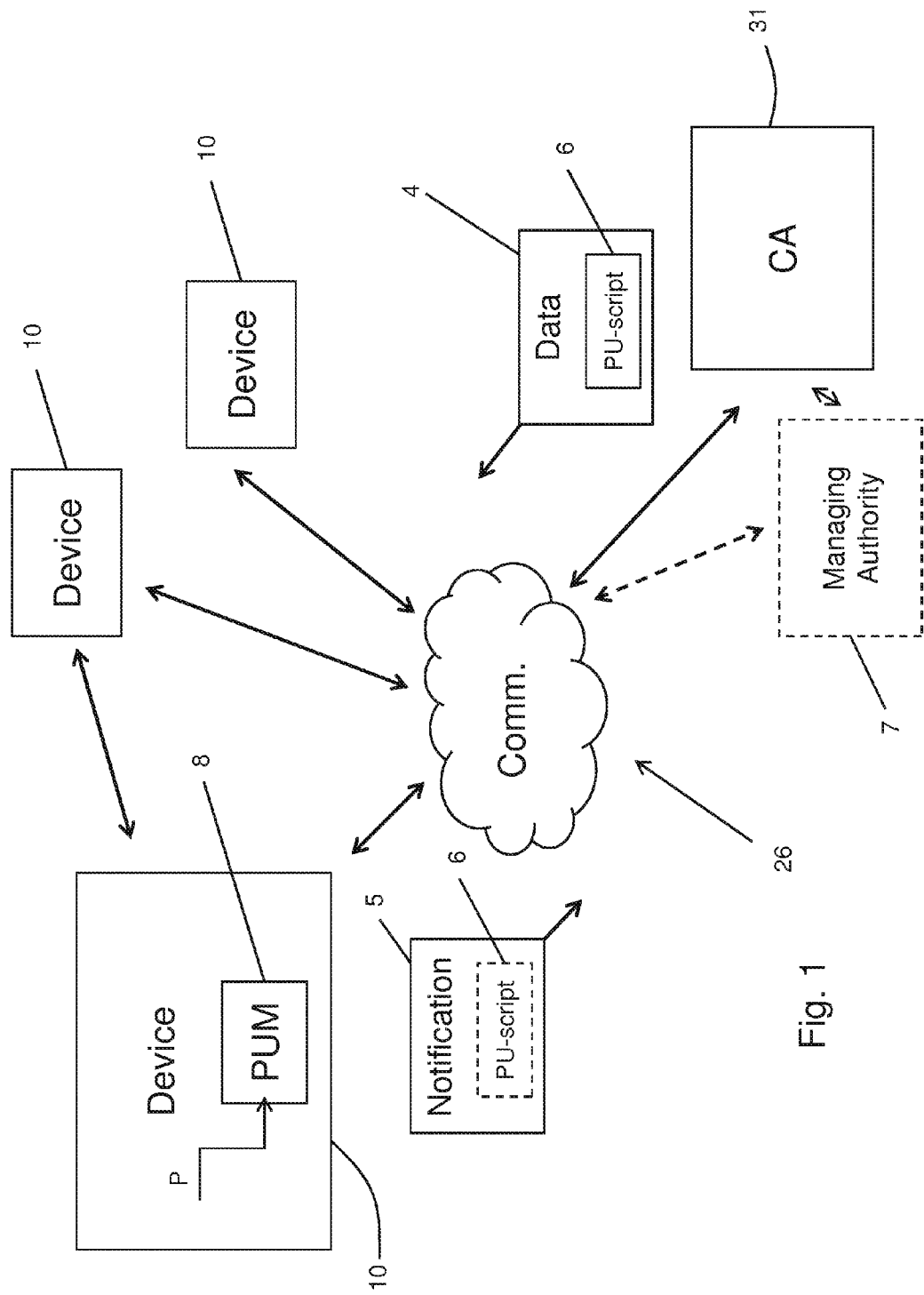
FIG. 1 is a schematic representation of a system of communicating entities.

In general terms, the following provides a method for updating operational policies for devices that involves the receipt and execution of executable (machine readable) code that algorithmically implements policy decisions to be employed by the recipient device. These policy algorithms can perform validation protocols utilizing the attributes embodied in the communication or pertaining to the communicating device. The policy algorithms may also utilize attributes supplementary to those contained in the certificate, such as the location of the device, and thereby allow factors not previously foreseen to be used in securely implementing a policy update on the recipient device which can, for example, replace the need for CRLs.

The code is advantageously embodied in a document or other data structure (e.g., a certificate) signed by a CA. We refer to this message as a Policy Update message, or PU-message. It may be useful for the CA, when signing the code, to associate and encode identifying and or versioning information along with it, and to sign the resulting compound encoding. If the CA is meant to sign and issue other information to be distributed to system entities (such as a traditional CRL, perhaps for reasons of backwards compatibility), it may more efficient to append this information to the code and sign the overall collection. For reasons discussed more fully below, the term PU-script is used to refer to the code implementing the policy algorithm, and any versioning or identifying information associated with this code. A detailed description describing how to augment a traditional CRL so as to contain a PU-script is also more fully described below. The presence of this PU-script is detected from the structure of the PU-message and the predetermined code deployed in the computing device associated with the recipient.

Upon receipt of a secured message having a bare (plaintext or unprocessed) message, a digital signature on the message, a certificate of the supposed signing entity, and perhaps a PU-message containing an PU-script, the secured message and the PU-message is verified according to normal verification protocols (which are predetermined at the time of manufacture of the system entity). The code in the PU-script is then executed in a special environment referred to for the purpose of description as a Policy Update Machine (PUM). The execution of the PU-script in this special environment executes the individual instructions contained in the PU-script code and implements a policy update, e.g., by determining and outputting the final validity status of the bare message, according to the policy encoded in the PU-script.

The instructions in the PU-script may include obtaining and analyzing supplementary information related to the device, such as, for example, information on the location, operating characteristics, history or other attributes of the device, including information about the secured message such as the bare message, the digital signature on the message, or the received certificate. Such information is used by the PU-script code to determine the ultimate validity of a received message and/or whether to implement a particular policy update, which informs the rest of the device logic (e.g., for a drone or other autonomous vehicle) to either accept or reject the message. By way of further example, the information may include time and date of manufacture of the device, thereby enabling devices with potential manufacturing deficiencies to be determined, or the location or projected destination of the device, thereby avoiding operation of the device in defined locations.

In an implementation, the instructions in the PU-script are performed by a virtual machine embodied within a PUM on the computing device. The PUM defines a versatile concise language in which instructions for updating the policy operative in the recipient device, and defines an environment in which the execution of the instructions is performed. The PUM is capable of executing the sequence of instructions encoded in this language that are contained in the PU-script. The PUM is designed to be able to operate in constrained environments, for example environments where communications bandwidth, processor memory or processor speed are at a premium. The PUM is invoked by the system entity in the process of validating system messages. Upon completion of the invocation the PUM may output values indicating the ultimate status resulting from the any application of the updated policy. The PUM may, for example, be implemented similar to a Java virtual machine executing Java bytecode representing a policy algorithm.

The algorithm encoded in a PU-script is performed by the PUM as it performs the actions indicated in the sequence of instructions. The environment within which these instructions are performed is controlled by the PUM. The instructions may involve inspecting or changing the execution environment provided by the PUM.

The PUM provides executing scripts access to a 'working' memory such as register stacks for use by the PU-script instructions and ideally to non-volatile storage which can be used to maintain information between subsequent invocations of the PUM. Such persistent storage may be used to store scripts or data for reference or execution by scripts executing in subsequent invocations of the PUM. The operation of the PUM will in general have effect on policies operative in the device. These updates to policy may update persistent and ephemeral storage on the recipient device.

When an entity is deployed as part of a system, it is provisioned with a specific PUM, incorporated for example as hardware or software. This machine may contain information and logic specifying and distinguishing the system from other systems administered by the CA. This PUM may be incorporated into the entity in a secure way that prevents later unauthorized changes, for reasons of security.

The PUM can be integrated into the system entity so that only PU-scripts that have been signed by the CA can be executed. The PUM may implement sandboxing technologies to control how system data is to be accessed and modified by executing scripts. This can mitigate concerns about the possibility of attacks involving the execution of malicious code by the PUM. It may be noted that particularly good protection against malicious execution comes from ensuring that the PUM executes only scripts signed by the CA.

Any document typically signed by CAs can be augmented to contain PU-scripts. For example PU-scripts may be placed in end-entity certificates. As a further generalization, the CA may create end-entity certificates containing PU-scripts which describe system policies specific to that entity, and may create CRLs containing PU-scripts that describe general system policy. In this case both scripts would be executed by the PUM in the process of determining the final validity status of a message, and in updating the system policy as a whole. The modifications to the description above required to implement these alternative embodiments will be apparent to those skilled in the art.

Referring now to the figures, in FIG. 1 a device 10 is shown, which includes a PUM 8 for executing a PU-script 6 included in data 4 sent by a CA 31 to the device 10. As shown in FIG. 1, the CA 31 can communicate the data 4 to the device 10 via various communication channels or links 26 such as a wireless network. The PUM 8 can be embedded into any electronic device 10 capable of implementing a security policy, such as a device 10 configured to perform cryptographic operations in addition to other functionality. For example, the device 10 can be a drone, driverless motor vehicle, computer system (e.g., server), cartridge, smart phone, wearable electronic device, equipment, weaponry, etc.

The PUM 8 is also coupled to or interfaced with one or more supplemental sources of data or parameters (denoted by "P") in FIG. 1. The parameters P can be used by the PU-script 6 executed by the PUM 8 to implement a policy update, e.g., to verify the data 4 or the proposed update. The parameters P can be determined on the device 10 or via an external connection, and may include, for example, location data, sensor data (temperature, pressure, altitude, etc.), device identifiers, software versions and/or identifiers, etc.

As illustrated in FIG. 1, a number of devices 10 may be networked or otherwise in communication with each other and the CA 31, e.g., in a network, fleet, group, product line, server farm, etc. In addition to receiving data 4 from the CA 31, a device 10 can also be configured to detect an issue or event within the network such as a security breach, virus, undesirable operating condition, theft, etc.; and generate a notification 5. The notification 5 can include a message or alert for the CA 31 to cause the CA 31 to generate a PU-script 6 to implement a policy change. Alternatively, the PUM 8 or other component of the device 10, can be configured to enable the device 10 to generate a PU-script 6 to be included in the notification 5. In this way, device-to-device policy changes can be implemented "in the field". As will be appreciated from the principles discussed herein, the device 10 may require access to a signing authority such as the CA 31 in order to sign any such policy updates generated on the device 10 but could also have such authority, or a more limited authority itself.

The CA 31 shown in FIG. 1 can also act as or otherwise be in communication with a managing authority 7 for the network. Alternatively, the managing authority 7 can include the CA 31 or otherwise assume the role of a CA 31. As such, it will be appreciated that various configurations are possible.

Figure 2:
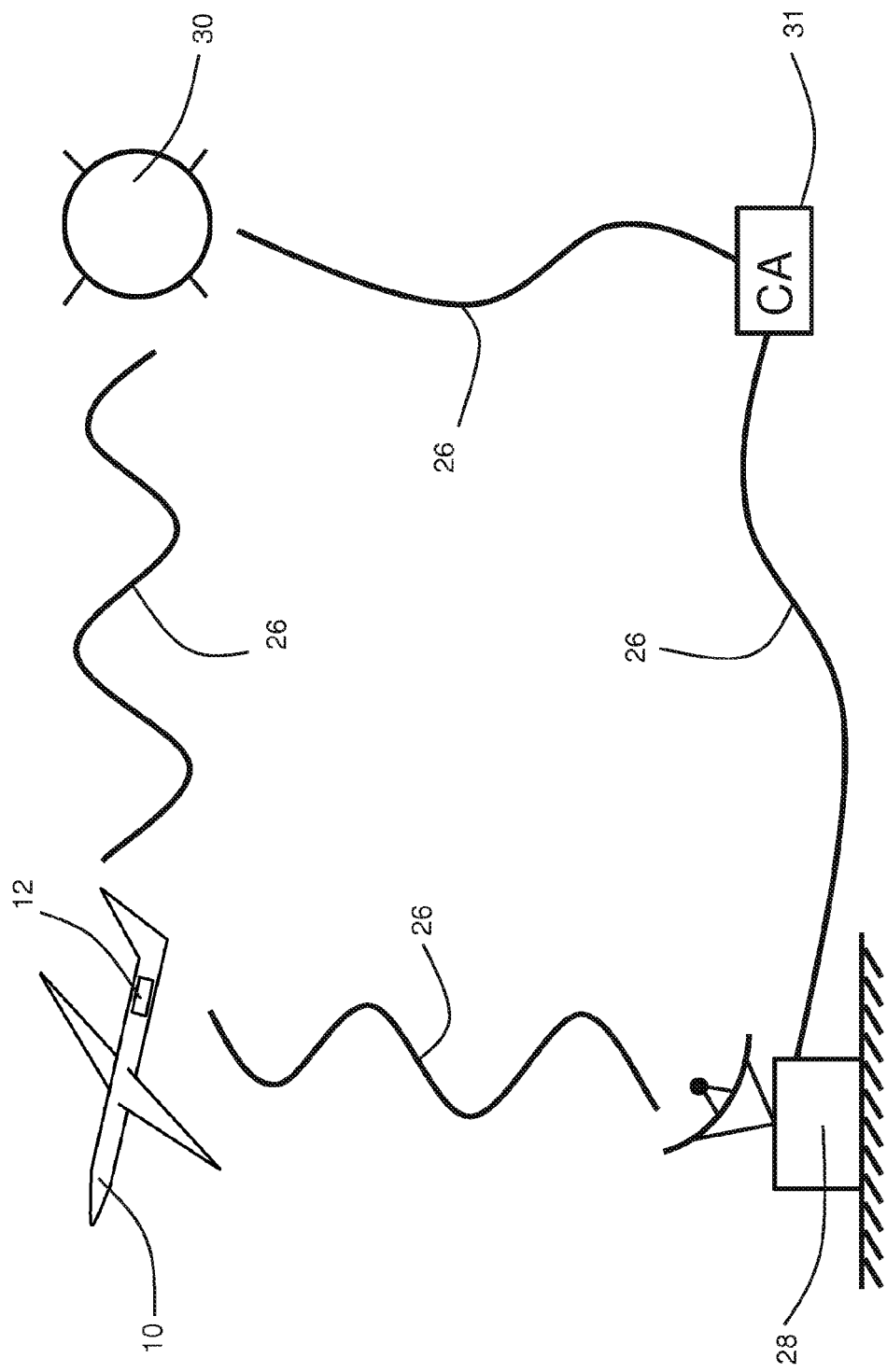
FIG. 2 is a schematic representation of a system of communicating entities for controlling an operational policy for a drone device.
Figure 3:
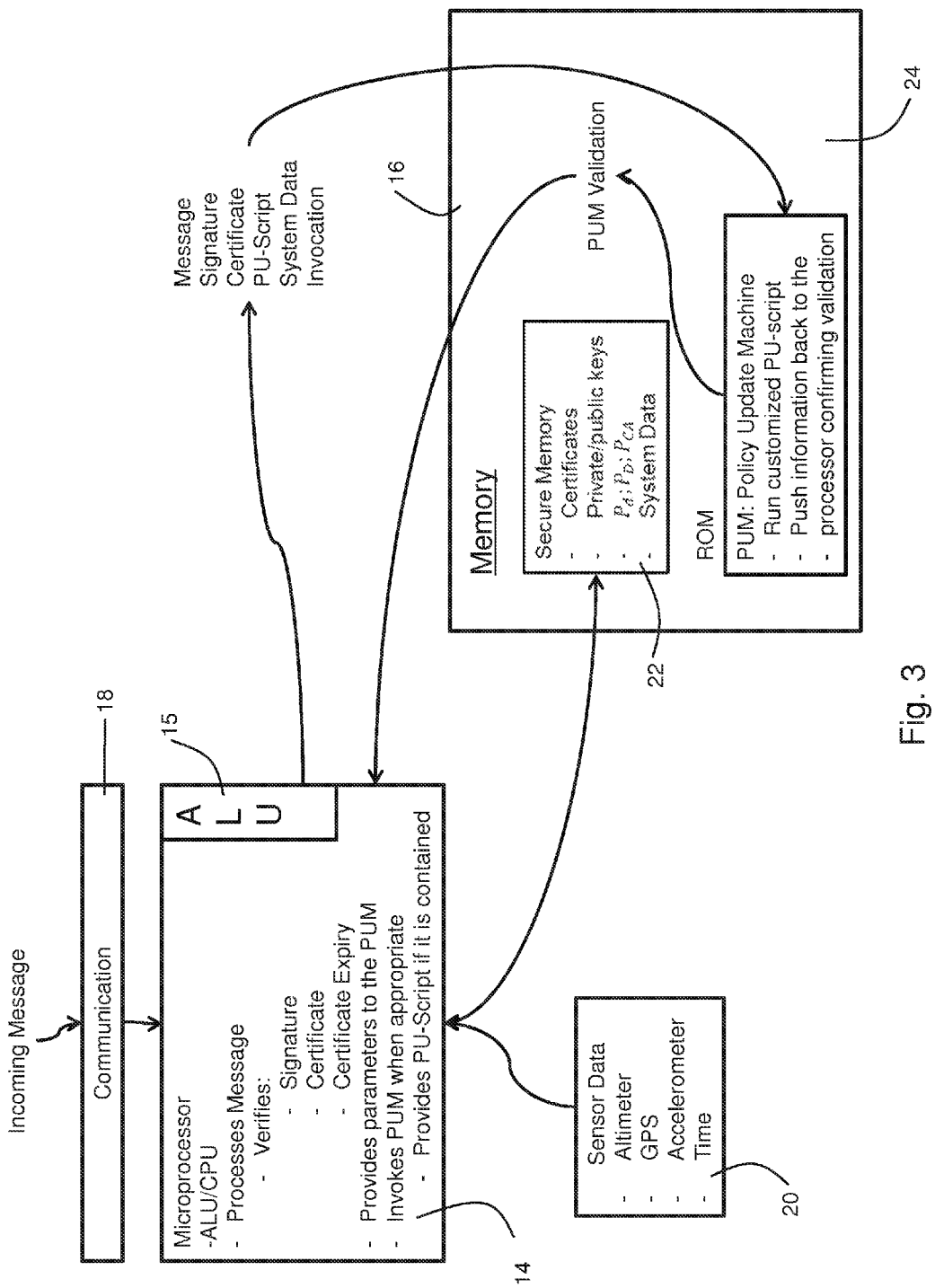
FIG. 3 is a representation of a control system of a PUM-equipped system entity from FIG. 1.

Turning to FIG. 2, an embodiment will be described in the context of a company that manufactures autonomous surveillance drone devices 10. The drone devices 10 include a control system 12 shown in greater detail in FIG. 3. The control system 12 includes a microprocessor 14 that interfaces with a memory 16 to control operation of the drone device 10 and to follow instructions stored in the memory. The microprocessor 14 receives data from system sensors, indicated collectively at 20, which monitor and report on the operation and environment of the drone device 10. An arithmetic logic unit (ALU) 15 forms part of the microprocessor and is provided to perform repetitive arithmetic routines associated with cryptographic operations. It will be appreciated that the above description is schematic of systems known to those skilled in the art and intended for illustrative purposes only.

The memory 16 includes a secure memory module 22 used to store sensitive information, such as encryption keys and public-key certificates, and a read-only memory (ROM) 24 that includes an instruction set to implement a PUM 8. As discussed above, the PUM 8 defines a versatile concise language in which instructions for determining message validation can be encoded, and defines an environment in which the execution of the instructions are performed, e.g., within a virtual machine. The use of a virtual machine enables a PU-script 6 to be deployed within a system of devices 10 agnostic of the underlying operating system, computing system and device type. Consequently, the PUM 8 provides a mechanism to target policy execution and policy changes at particular components of the device 10 rather than the device's overall computing architecture. The PUM 8 can also enable systems that are normally difficult to upgrade to be upgradeable using PU-scripts 6.

The PUM 8 may, for example, be implemented similar to a Java virtual machine executing Java bytecode representing a policy algorithm. By way of example, a PUM 8 could include a java virtual machine and the PU-script 6 could include java bytecode for the java virtual machine. The fixed logic of the device 10 could provide auxiliary data (i.e. parameters P) to the executing bytecode by encoding the data in files or memory accessible to the executing bytecode.

Figure 4:
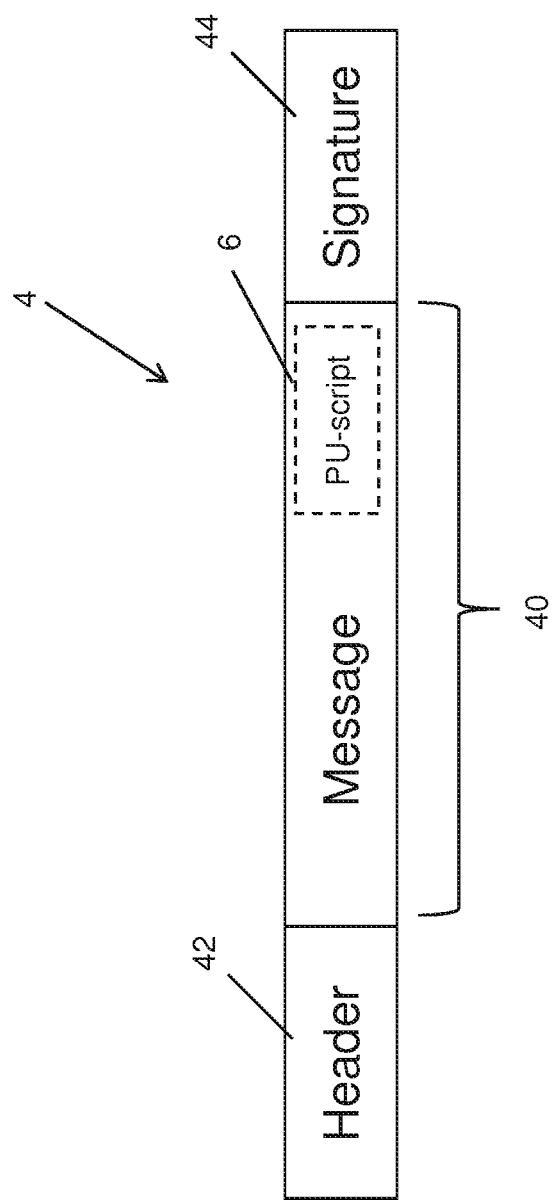
FIG. 4, is a representation of a PU message containing a PU-script.

An example of a PU-message, i.e. data 4, is shown in FIG. 4. In this example, a message 40 contains a PU-script 6. The PU-message 4 also includes a header 42 and a signature 44. The signature 44 can be on the PU-script 6 or on additional data such as the entire message 40 containing the PU-script 6.

Figure 5:
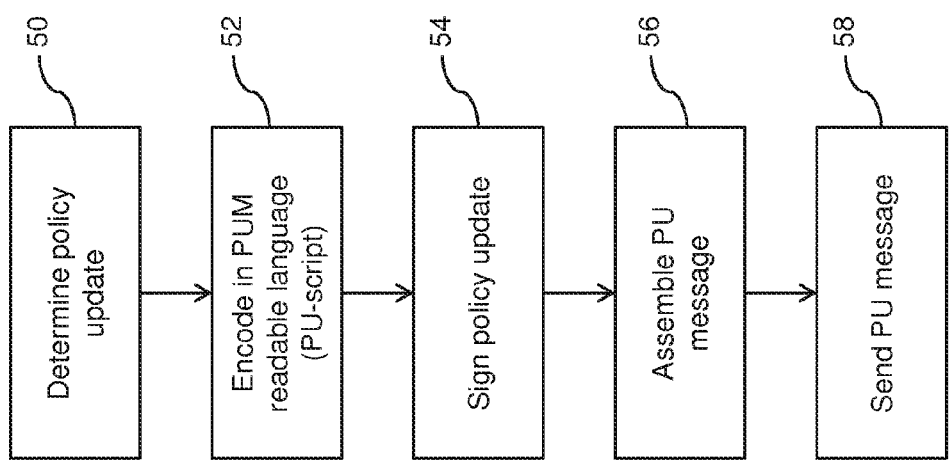
FIG. 5 is a representation of the steps involved in generating a PU message.

Turning now to FIG. 5, steps performed by a CA 31 or managing authority 7 in providing a policy update to one or more devices 10 are shown. At 50, the policy update to be made is determined. For example, the policy may include new operating parameters (e.g. location or temporal ranges), instructions to disable communications, or any other instruction or policy attribute applicable to the application. The CA 31 or managing authority 7 then encodes the policy update in PUM-readable language to generate the PU-script 6 at 52. The policy update is then signed at 54, e.g., by signing the PU-script 6 or entire message 40. If the managing authority 7 is generating the policy update, communication with the CA 31 may be required in order for the signature 44 to be accepted by the PUM 8. The PU-message is assembled at 56, e.g., by adding a header, routing information, etc., and the PU-message is sent to one or more devices 10 at 58.

Figure 6:
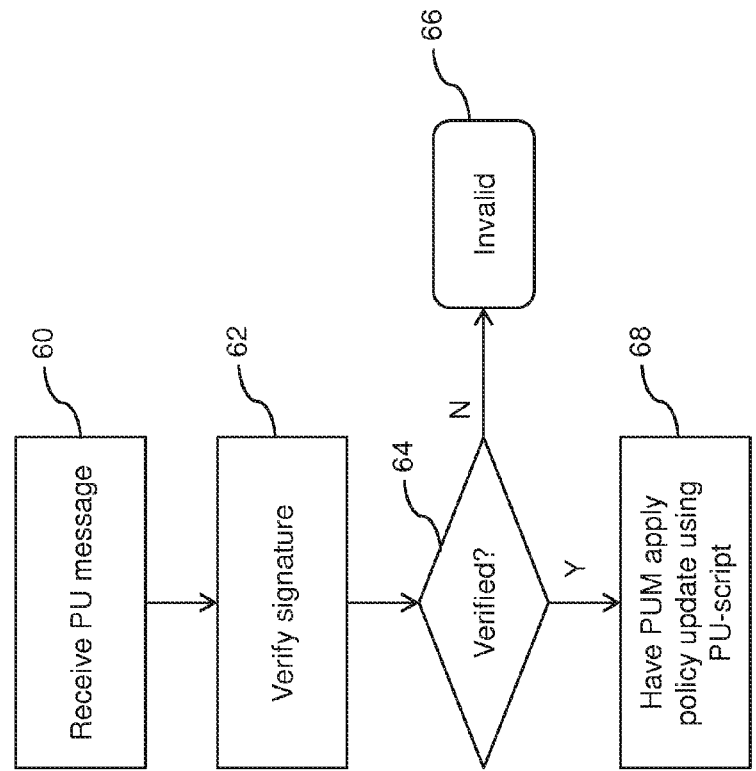
FIG. 6 is a representation of the steps involved in processing a PU message received by a device.

FIG. 6 illustrates steps performed by a device 10 to implement a policy update using a PUM 8. At 60 the PU-message is received and the signature 44 is verified at 62. If the signature 44 cannot be verified at 64, the PU-message is considered invalid at 66. If the signature 44 can be verified as originating from the CA 31, the PUM 8 applies the policy update using the PU-script 6 at 68.

As mentioned above, a device 10 can also detect issues or events in the field which lead to policy updates to that device 10 and/or other devices 10 in a network or group. FIG. 7A illustrates one example in which the issue or event requiring such a policy update is detected at 70 and a notification 5 is generated at 72. The notification 5 in this example is sent at 74, to a policy authority such as the managing authority 7 or CA 31. By sending the notification 5, a policy update can be generated, e.g., according to the steps shown in FIG. 5, and subsequently at 76 a PU-message is received with a new policy update.

Alternatively, as shown in FIG. 7B, the PUM 8 or other component of the device 10 can be configured to generate a PU-message itself. In such an alternative, the issue or event is detected at 80 and the device 10 determines whether one or more other devices 10 may be affected and thus also require the policy update (e.g., to distribute the policy update in the field). The operations shown in FIG. 5 are then implemented at 84 in order to generate and send a PU-message to one or more other devices 10. It can be appreciated that the PU-script would also be executed on the same device 10 generating the policy update in order to perform a local policy change in this example.

As mentioned above, PU-scripts 6 may be placed in any documents or messages or other data 4 typically signed by CAs 31, such as entity certificates or CRLs. In general a PUM 8 will begin with a default PU-script 6 established at device manufacture and, when invoked, will search for new PU-scripts 6 signed by the CA 31 amongst its provided inputs. For simplicity of explanation in what follows we use an example of the case where PU-scripts 6 are contained in CRLs, making reference to FIGS. 8-10.

Figure 8:
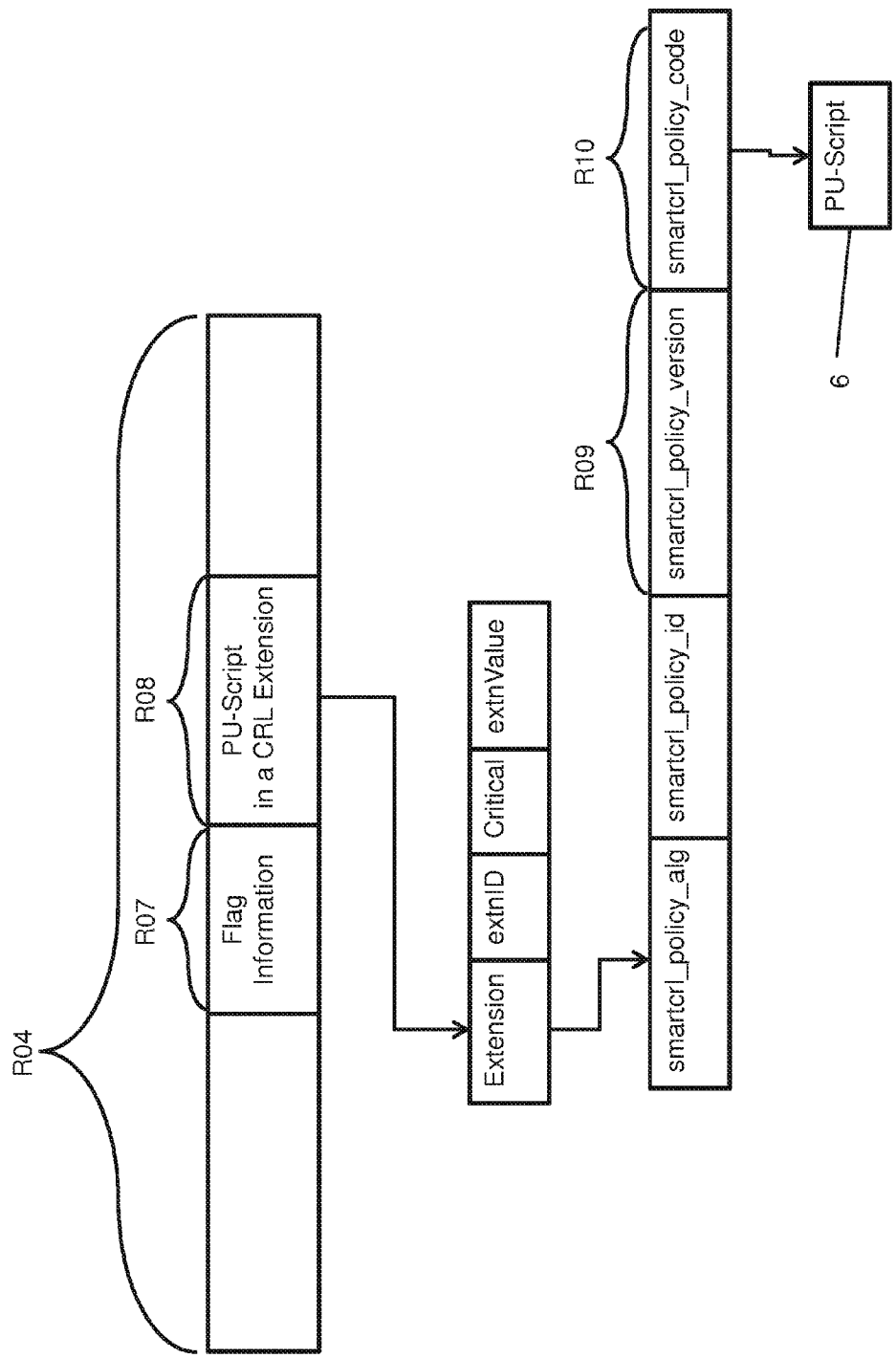
FIG. 8 is a representation of a CRL modified to contain a PU-script encoding policy algorithms to be used by system devices in FIG. 1.

Returning to the drone device 10 example, during manufacture, the drone device 10 is provisioned with a private key $p_d$, a corresponding public key $P_D$ contained in a certificate $C_D$ signed by the CA 31, and the public key $P_{CA}$ of the CA 31. The private key $p_d$ and public key $P_{CA}$ are stored in the secure memory module 22 so as to be tamper resistant with limited access. The secure memory module may contain both RAM memory, ROM memory, and non-volatile memory. The private key $p_d$ and certificate $C_D$ are used in conjunction with predefined hardware or software logic implemented by the microprocessor to process messages received through the communication port 18 and exchange messages with other system entities, such as a ground station 28 or satellite 30, over communication links 26 (see FIG. 2). The ground station 28 and satellite 30 are part of a communication network that includes the CA 31 that provisions the entities in the system with certificates and regularly issues PU-script-containing CRLs, such as the one depicted in FIG. 8. As illustrated in FIG. 8, a CRL R04 can include flag information R07 to indicate that a PU-script 6 is included in an extension R08 to enable the PU-script to be found and executed by the PUM 8. FIG. 8 also includes an illustrative example of a structure for the CRL extension, including a policy version R09 and the policy code R10 itself from which the PU-script 6 can be extracted from the CRL R04.

Similarly the ground antenna station 28 is also provisioned with a private key $p_a$, a public key $P_A$ contained in a certificate $C_A$ signed by the CA 31, and the public key $P_{CA}$ of the CA 31.

Additionally, during manufacturing, system devices 10 are provisioned with a default PU-script 6 that is also initially identified as the 'LATEST'. This script may be integrated into the ROM 24 or secure memory 22 of the drone device 10, for example. The details of this default script are described in greater detail below.

Suppose now that the ground antenna station 28 is meant to send a message to a drone device 10. The original message is to be protected using digital signatures, and so station 28 signs the message with its private key $p_a$, creating a digital signature on the message. The station 28 then sends the resulting 'secured message', including of the original message, a digital signature, and the signor's certificate; to the drone device 10.

The drone device 10, upon receiving a supposed secured message having a message R01, a signature R02, and a certificate R03 as indicated in FIG. 10, processes this data to determine if it is authentic and safe to act upon. As is typical in systems using digital signatures, the CPU 14, and predefined logic associated with the validation of secured messages of the type received, perform steps to verify the digital signature R02 on the message R01 using the public key in the certificate R03, verifies whether the certificate R03 contains a valid signature by the CA 31, may verify that the certificate R03 has not expired and, if a CRL R04 is available, verifies the CA's signature on it and verifies that the certificate R03 is not listed in it as being revoked. Some of these operations may involve the use of an ALU 15. The predefined logic also temporarily stores the results (valid, or invalid with some error message) of these predefined verifications in secure memory 22 as indicated by R05. At this point the predefined logic invokes the PUM 8 to determine the final validity status of the bare message R01 as we now describe. Upon this invocation, the message R01, signature R02, certificate R03, and the results R05 of the predefined verification processes are input to the PUM 8. Other system data, such as those illustrated in 20, or a mechanism by which to identify and query the values of the data illustrated in 20, is also input to the PUM 8 upon invocation. If the drone 10 has access to a CRL verified to be signed by the CA 31 it too is input to the PUM 8 upon invocation.

The behaviour of the PUM 8 upon invocation is different depending on whether or not a CRL has been provided. The case where no CRL has been provided is described first to provide an example of PUM invocation.

When the PUM 8 is invoked without a CRL as input, it finds and prepares to run the PU-script with the identifier 'LATEST'.

This preparation includes making the inputs to the PUM (including the message R01, signature R02, and certificate R03, and results of the hardcoded verification processes R05) available to the script about to be executed. This will also include making available to the executing script information about or a mechanism to query information about the device 10 that invoked the PUM 8, including information such as the certificate $C_D$ of the device 10, information about sensor data 20, and the contents of memory 16.

The mechanism by which this information is made available to any executing script will depend on the detailed implementation of the PUM 8, but several techniques are known to those skilled in the art such as providing a hash table/dictionary for the executing script to query. The PUM 8 then executes the sequence of instructions in the PU-script 6 having the identifier "LATEST". The result of this execution is a final verification status result indicating whether the bare message R01 is to be considered completely verified and fit for further processing by the rest of the device's system logic.

As mentioned earlier, when system entities are initially manufactured they are equipped with a hard-coded default script that is initially also given the identifier "LATEST". In this example, the default script is an encoding of instructions in the language of the PUM 8 that implements the following policy logic: "Examine the results of all the predetermined verifications, and return a final verification status equal to 'VALID' if all predetermined checks are valid, and 'INVALID' otherwise.

When the PUM 8 is invoked with a PU-message as data 4 to be input, the following steps are performed by the PUM 8.

The PUM 8 first checks the results R05 of the predefined verification checks to determine if the PU-message contains a valid signature by the CA 31.

If the results R05 indicate that the PU-message does contain a valid signature by the CA 31, then information R07 in the PU-message are checked to see if the PU-message contains an encoded PU-script 6 in one of its extensions.

If the flag indicates that there is an encoded PU-script R08 in an extension of the CRL, then this PU-script is extracted and parsed into fields as indicated in FIG. 4.

In an example scenario, the PUM 8 checks the value R09 in the version field in the PU-script 6, and if this version is less than or equal to the value in the version field of the PU-script 6 that is also identified as 'LATEST' then the PUM 8 performs the same actions as if it had been invoked with no CRL at all, as described above.

If the value R09 in the version field in the PU-script 6 is greater than the value in the version field of the 'LATEST' script, then the PUM 8 tries to store the PU-script 6 (R08) in the secure non-volatile memory of 22, and if this is unsuccessful, the PU-script 6 performs the same actions as if it had been invoked with no CRL at all, as described above.

If the attempt to store the PU-script 6 (R08) in the secure non-volatile memory is successful, then the PUM 8 now identifies this newly stored PU-script 6 (R08) as the 'LATEST', removing this identifier from the script previously identified as the 'LATEST'. The PU-script 6 then performs the same actions as if it had been invoked with no CRL at all, as described above.

The ability of the CA 31 to create and issue CRLs containing new policy algorithms encoded as PU-scripts 6, and the ability of such scripts 6 to inspect attributes of the system as their code is executed by the PUM 8 enables a dynamic means to change and define policies under which the drone device 10 will operate. Different implementations will be described below but as a general explanation using the example above, the code in the PU-script 6 may cause inputs from the GPS of the drone device 10 to determine if it is operating in an authorised area. Within the context of an area of conflict, the areas in which the drone device 10 may operate may change rapidly. If necessary, for example, the CA 31 can create a system PU-message as illustrated in R04 containing an PU-script 6 identified as R08 in FIG. 8, that contains an encoding of a sequence of instructions R10 that when executed by the PUM 8 inhibit response to certain commands when the sensor data 20 indicate the drone device 10 is in an area now deemed to be unsafe. This may be done without revoking the certificate C_A of the sender, enabling continued communications between the drone device 10 and the antenna 28 once the drone device 10 leaves the unsafe area.

In addition to supporting basic computational operations the PUM language may contain instructions for modifying/comparing/copying:

1) the output status of any fixed, predetermined, or hardcoded verification checks performed by the device hardware or software, 2) the entirety of the secured message received by the drone entity, including any CRLs sent with or associated with the message and any other cryptographic data (signature, certificate) associated with the bare message, 3) information about the drone device 10, including any certificate or other identifying information about the drone entity, and 4) any other PU-scripts 6 known to the PUM 8 (and instructions for executing them).

The PUM language may contain instructions for inspecting and comparing sensor data such as:

i) the time (as determined by the PUM 8);
ii) GPS coordinates (as determined by the PUM 8); and
iii) other information such as temperature, altitude, electromagnetic information, pressure or sound information, environmental or system information, as determined by the PUM 8 and the drone's sensor system.

The use of an PU-script 6 to utilise attributes of the system and determine the validity of a message based on those attributes enables many situations to be addressed. For example, the algorithm encoded in an PU-script 6 may instruct the PUM 8 to declare the message invalid if the sender certificate R03 satisfies a certain property. This allows the CA 31 to publish an PU-script 6 which can concisely detect messages from any of a group of system entities whose messages should be considered invalid.

Similarly, the algorithm encoded in an PU-script 6 may instruct the PUM 8 to change the policy which decides when certain operations are allowed. For example, a change in policy may declare an entity message invalid if the current time satisfies certain conditions. This might be useful if a CA 31 decides that any message received, say, during the evening hours should be considered invalid.

The algorithm encoded in an PU-script 6 may instruct the PUM 8 to change operating policy so that, for example, a message is declared invalid if the sending entities certificate satisfies some property and in addition the current time is between two specified dates. A consequence of this is that a single PU-script 6 can cause any message received from a given entity to be considered invalid for a temporary period of time, or may cause a change in device behaviour for a certain time frame, by encoding the desired change in the PU-script 6.

The algorithm encoded in an PU-script 6 may instruct the PUM 8 to declare a message invalid if the message satisfies a certain condition. This allows the creation of PU-scripts 6 which can detect and reject messages the CA 31 has decreed to be malicious even when the sending entity is still considered part of the system.

The algorithm encoded in an PU-script 6 may instruct the PUM 8 to declare an entity message invalid depending on data in the local entities (the receiver of the secured message) certificate, or aspects of the system state (as reported by the PUM 8). This allows the creation of PU-scripts 6 which can determine validity or invalidity based also on information about the both the sender and receiver of a message. This is useful if you want certain communications to be considered valid by some system entities, and to be considered invalid by other system entities.

The algorithm encoded in an PU-script 6 may instruct the PUM 8 to declare an entity message invalid if the GPS coordinates, as reported by the PUM 8, satisfy a certain condition. This allows the creation of PU-scripts 6 which instruct system entities moved away from or into certain geographic locations to consider received messages invalid.

The algorithm encoded in an PU-script 6 may instruct the PUM 8 to remove or insert certificates into the trust anchor of the system, or change the identifier of the system, or insert or remove a specified PU-script sequence into any persistent memory of the PUM 8, or otherwise change system data as supported by the PUM 8. In general the PU-script 6 may instruct the PUM 8 to modify the operational policy under which the device works, including the acceptance of messages, but also changes to how the device 10 itself behaves in general.

The algorithm encoded in an PU-script 6 may instruct the PUM 8 to append a CRL or other CA-signed document containing an PU-script 6 to secure messages that are being validated by the PUM 8 before transmission. The algorithm encoded in a PU-script 6 may also instruct the PUM 8 to modify a secure message being validated before transmission, and in particular may replace the local entities certificate in that secure message with multiple certificates forming a certificate chain. In the latter case the new certificates in the certificate chain may include all or part of an PU-script 6. In this way new PU-scripts 6 can be spread to other devices of the system.

Figure 9:
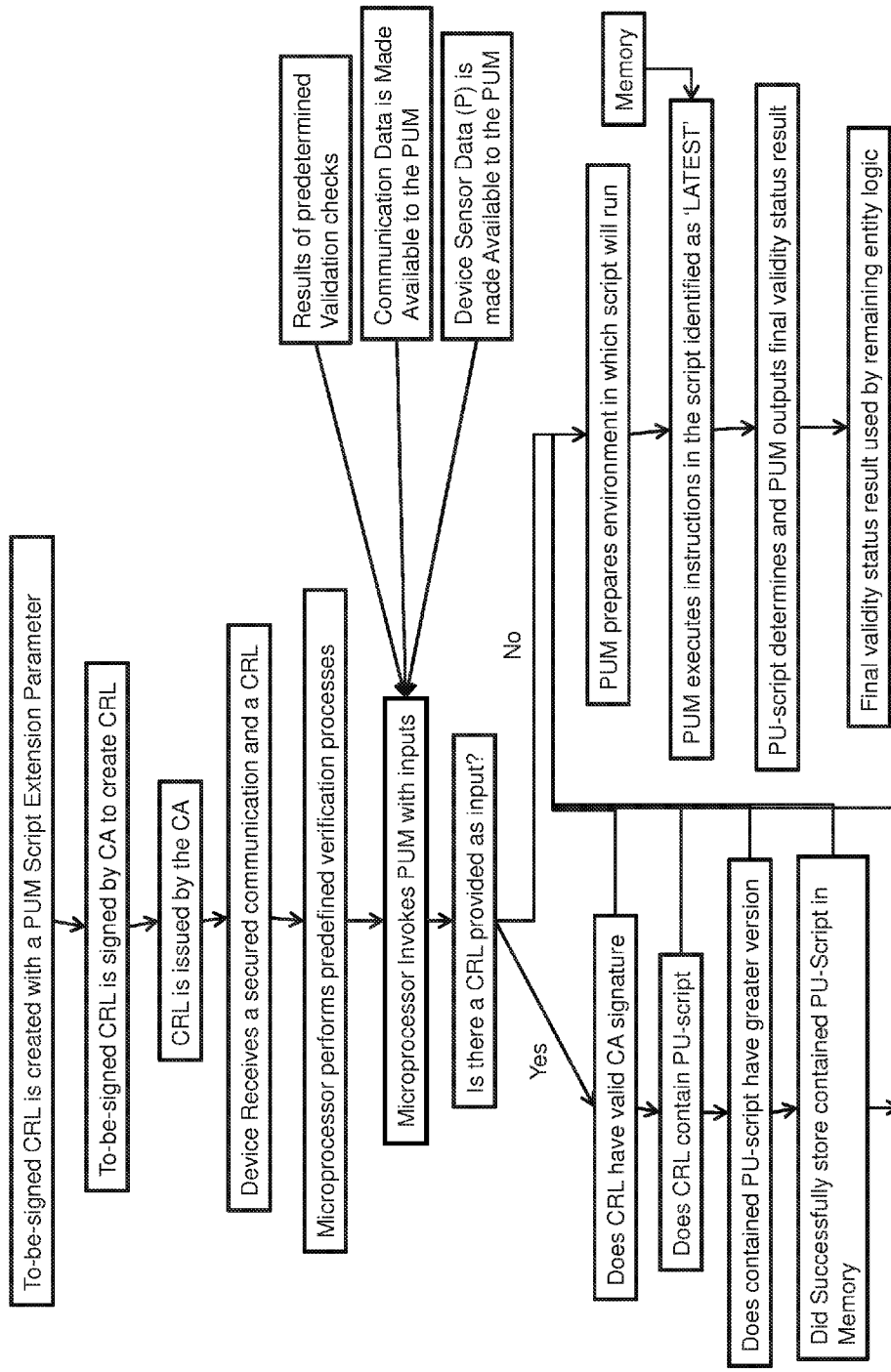
FIG. 9 is a representation of the steps involved in creating a CRL containing a PU-script and subsequent processing of a secured message and such a CRL by entities in the system of FIG. 1.

The steps involved in creating a CRL containing a PU-script and subsequent processing of a secured message and CRL by devices 10 in the system is shown in FIG. 9. The to-be-signed CRL is created with a PUM script extension parameter and the to-be-signed CRL is signed by the CA 31 to create the CRL. The CRL is then issued by the CA 31 and the device 10 receives a PU-message (e.g., a secured communication) and a CRL. A microprocessor on the device 10 performed one or more predefined verification processes and invokes the PUM 8 with inputs. For example, the inputs can include the results of predetermined validation checks (exemplified above), communication data, and parameters P such as sensor data. The microprocessor determines if there is a CRL. If so, it is determined whether or not the CRL has a valid signature, and whether or not the CRL contains a PU-script 6. It is then determined whether or not the PU-script 6 has a later version than "LATEST" and whether or not the PU-script has been stored in memory. Assuming these checks pass, the newly stored PU-script 6 is identified as "LATEST".

The PUM 8 then prepares the environment in which the PU-script 6 will run and executes the instructions in the PU-script 6 identified as "LATEST" (i.e. the new script or a previous version if a CRL was not included). The PU-script 6 determines, and the PUM 8 outputs a final validity status result in this example to verify the communication received by the device 10 and the result is used by the remaining entity logic, e.g., to perform a policy update, etc.

It can be appreciated that the operations shown in FIG. 9 can apply to any message 40 containing a PU-script 6 and the CRL example is illustrative only.

The embodiment shown in FIGS. 8-10 has been described in the context of securing bare messages R01 using the method of digital signatures and digital certificates, but the principles can be used with other mechanisms for securing messages or modifying device policy and behaviour in general. For example, it will be appreciated that similar techniques can be applied if messages are protected using public key encryption protocols, for example. In particular when a system device wants to encrypt a message to another system entity, the predefined logic verifies the CA's digital signature on the recipient entities certificate, and verifies that the certificate has not expired. The predefined logic performs a public-key encryption algorithm to encrypt the message intended for the recipient device. Then, in a manner similar to the above, the inputs to and results of these predefined steps are made available to the PUM 8 as it is invoked. The behaviour of the PUM 8 once invoked is as described previously. On completion of its invocation the PUM 8 may output a status indicating whether the message should be considered valid (allowed to be sent to the peer) or discarded. Similarly, the receiver of a public-key encrypted message consisting of encrypted message data, public key material in a certificate, and possibly other associated data might perform predetermined checks and processing on this data and then may subject it and the results of the processing to final validity checking by an PUM 8.

Further examples of the use and advantages of the additional flexibility to describe new policy as PU-scripts 6 to provide dynamic control and also dynamic validation of messages are described more generally below.

Temporary Revocation:

As above, consider a manufacturer of drones and other entities, and a system where many such devices 10 have been deployed. On the date Jan. 2, 2016 the manufacturer detects that certain devices are acting strangely. The manufacturer is worried they have been compromised by a virus that may in fact be spreading through the system as devices 10 communicate. Using traditional PKIs, the system CA 31 has little choice but to revoke the devices 10 in question and bring them in from the field for detailed inspection. If it turns out that the devices 10 were not in fact compromised, they would still be issued new certificates since their old certificates have been (permanently) revoked.

However, using the system described herein, the following option is available to temporarily "freeze" communications. The manufacturer can create a policy algorithm (encoded in the language of the PUM 8) that effectively indicates: "If the remote device identity satisfies specified criteria, and the current date is before Jul. 2, 2016, then return a final validity status of INVALID". This algorithm can then be encoded as an PUM-script 6 and signed by the CA 31, and then distributed to devices 10 in the system.

The effect of this policy is that the specified devices 10 cannot talk to any other system devices for the next week. This provides time for the manufacturer to further investigate the problem, and at the same time prevents the spread of any virus, if there indeed is one. During the next week, the manufacturer may learn that the devices 10 are not compromised and the strange behaviour is a simple anomaly, then the manufacturer can simply wait out the week, at which point the devices will again be able to talk to other system devices normally.

If the manufacturer learns the devices are indeed compromised with a spreading virus, the CA 31 can then subsequently issue another PU-message which permanently revokes the identified devices 10.

CRL Compression:

As above, imagine that many thousands of such devices 10 have been deployed. The manufacturer detects that certain devices 10 are acting strangely and have indeed been compromised. With further investigation the manufacturer realizes that every device made on assembly line '5' has been compromised. In fact it is possible to determine that the device 10 was made on that assembly line because the third digit in the serial number of the device 10 encodes the assembly line the device 10 was made on. In this example, assume that almost 2000 devices were made on that assembly line and must be revoked.

Using traditional CRLs, the only option may be to issue a CRL that lists the serial numbers of the devices 10 in question. This means that, for the near term at least, every CRL issued by the CA would need to contain these 2000 serial numbers, and consequently the CRL will be rather large.

However, by using the techniques described above, another option is available. The CA 31 may encode a policy algorithm that says (in the language of the PUM 8) that "If the third digit of the serial number in the certificate of the remote device is a '5' then return a final validity status of INVALID". Such an algorithm can be encoded very compactly and consequently it is possible to revoke the entire set of compromised devices with a very compact PU-script 6. Such an PU-script 6 in the context of the principles discussed herein ensures messages received from all such compromised devices are considered INVALID.

It may be noted that in many cases, it may be unlikely that the manufacturer could have predicted a compromise of this sort, but nonetheless the existence of a pattern in the certificates of the devices 10 to be revoked along with the computations and information provided by the PUM 8 allow an elegant solution to this problem nonetheless. In general the techniques above provide the ability to address unanticipated security compromises by using the flexibility of the PUM language to encode policy decisions in a PU-script 6.

Geo-Fencing:

Geo-fencing refers to the use of GPS coordinates in controlling functionality of a device 10.

For example, the company may want to allow drones to operate and communicate only within a certain geographic area (for example, the drone can only operate when inside one of several designated geographic regions).

Using the described techniques and by deploying a policy algorithm implementing "If the local devices GPS coordinates do not fall within prescribed specified ranges then return a final validation status of INVALID" will prevent operation of drones outside the designated areas.

Other Policy Update Scenarios

In a first scenario, devices 10 representing entities (e.g., drones, agents, computer systems in a secure network, etc.) are suspected of being compromised. For example, the compromise may be an "infection" with a security problem such as a virus or infectious internet-worm-like vulnerability. An initial policy in the devices 10 would outline typical behaviour and communications that can be expected. Devices 10 that are in communication with other devices 10 can use this policy to evaluate the state of other devices 10, e.g. in communicating with neighbouring devices. When a device 10 becomes corrupted, a neighbouring device 10 can detect the corruption and notify the managing authority 7 or CA 31. The managing authority or CA 31 can then take steps to first broadcast PU-scripts to all devices, which will change the policy under which those devices will interact with the compromised device. Later the authority can remediate the compromise and send out a new PU-script such that other devices 10 re-accept the previously compromised device 10.

In a second scenario, devices 10 similar to those in the first scenario experience a temporary or provisional compromise. For example, a particular device 10 may be compromised, but the managing authority 7 is not certain that the device 10 is in fact compromised. In such a scenario, a PU-script 6 can be sent to the device network such that devices 10 become wary of the particular device 10 that is suspected of being compromised, and modify its behaviour regarding the potentially compromised device, for example, not act on relayed data from the potentially compromised device. Subsequently, if it is determined that there was no reason to be wary of this device 10, the device 10 can be re-instated using another PU-script 6 distributed to the device network.

In a third scenario, it is assumed that the compromise occurs to a managing entity but the entity generating the PU-scripts 6, such as the managing authority 7 or CA 31, remains uncompromised. In this case, the devices 10 are sent a PU-script 6 containing a policy update that designates a new managing entity and thereafter the devices 10 in that network respect the new authority until a further update in policy is detected (e.g., similar to the re-instatement in the second scenario).

In a fourth scenario, consider the devices 10 to be drones, soldiers or military equipment, which have the capability of detecting whether a nearby device 10 has been compromised. For example, one device 10 may be able to detect if another device 10 is too close to a specific facility location. An observing device 10 can send a notification or PU-message to its neighbours to inform them of the suspected compromise or failure. Similar to scenario two, after the suspected device 10 is recovered or otherwise rehabilitated, it can be re-accepted and new PU-scripts 6 generated to inform other devices 10 in that network. A similar example could be applied to vehicle or equipment theft wherein during a certain period of time or time of day a device 10 exhibits unexpected behaviour such as movement (i.e. indicating it has been stolen). An observing device 10 could send a notification that enables the compromised device 10 to be recovered.

In a fifth scenario, the devices 10 are agents, soldiers, employees, etc., which receive signed information regularly letting them know their location. Some of the devices 10 are configured (e.g., using short-range communication beacons such as BLUETOOTH beacons) to broadcast signed PU-scripts 6. This ability enables behaviours to be changed according to location (e.g. cannot send certain types of messages in certain areas, etc.). For example, this allows geo-fenced privileges where devices 10 in certain locations are trusted, while others in borderline locations are given less trust or even no trust in restricted locations. A similar application can be applied temporally such that certain behaviours are dictated by the time of day, day of week, etc.

In a sixth scenario, the devices 10 are weapons or other equipment that could pose a threat to public safety, e.g., if commandeered or stolen. By being provisioned with a PUM 8, a policy that exists or is provided using a PU-script 6 can be used to disable the weaponry or equipment in certain geolocations. Alternatively, a PU-script 6 can be broadcast to these devices 10 to disable them until they are engaged with certain challenge and authentication sequences. Similar to the second scenario above, a compromised device 10 can be re-enabled when attended to and a further PU-script 6 broadcast accordingly.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device 10, CA 31 or related device or entity, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of having a device in a communication system update an operational policy for the device, the method comprising:
    encoding a policy update in a virtual machine language used by a virtual machine residing on the device, the virtual machine being operable on the device independently of the components of the device to target policy execution at one or more particular components of the device rather than at an overall computing architecture of the device, by enabling the virtual machine to communicate with the particular components of the device using defined inputs and outputs and without the one or more particular components being within the virtual machine, the virtual machine being deployable on the device agnostic of an underlying operating system;
    having the policy update signed by a trusted entity; and
    sending a message comprising the signed policy update to the virtual machine on the device to enable the device to implement the policy update by having the virtual machine on the device execute the policy update and indicate validation of the policy update, wherein the message is configured to be authenticated using a cryptographic scheme.

2. The method of claim 1, wherein the policy update considers at least one parameter associated with the device, the at least one parameter being supplemental to information contained in the message.

3. The method of claim 1, wherein the policy update determines whether or not another message should be considered valid.

4. The method of claim 3, wherein the validity of the other message is determined according to any one or more of: a restriction in timeframe, an acceptable sensor range, a geo-location, or a specified sensor or system parameter.

5. The method of claim 1, wherein the policy update causes at least one change to a state of the device.

6. The method of claim 5, wherein the state corresponds to any one of: an acceptance of a new password, an update of logic under which the device will operate, or the provision of new components of data which the device will receive and accept.

7. The method of claim 1, wherein the policy update is included in a digital certificate and the trusted entity is a certificate authority (CA).

8. The method of claim 7, wherein the policy update is included in an extension of a certificate revocation list (CRL).

9. The method of claim 1, wherein the message is configured to be authenticated by being signed with an asymmetric key cryptographic scheme.

10. The method of claim 9, wherein the asymmetric key cryptographic scheme is an elliptic curve (EC) signature scheme or an RSA signature scheme.

11. The method of claim 1, wherein the message is configured to be authenticated with a symmetric-key scheme.

12. The method of claim 1, wherein the message is configured to be authenticated with an authenticated encryption scheme.

13. A non-transitory computer readable medium comprising computer executable instructions for having a device in a communication system update an operational policy for the device, the computer executable instructions comprising instructions for:
    encoding a policy update in a virtual machine language used by a virtual machine residing on the device, the virtual machine being operable on the device independently of the components of the device to target policy execution at one or more particular components of the device rather than at an overall computing architecture of the device, by enabling the virtual machine to communicate with the particular components of the device using defined inputs and outputs and without the one or more particular components being within the virtual machine, the virtual machine being deployable on the device agnostic of an underlying operating system;
    having the policy update signed by a trusted entity; and
    sending a message comprising the signed policy update to the virtual machine on the device to enable the device to implement the policy update by having the virtual machine on the device execute the policy update and indicate validation of the policy update, wherein the message is configured to be authenticated using a cryptographic scheme.

14. A system for having a device in a communication system update an operational policy for the device, the system comprising a processor and memory, the memory comprising computer executable instructions for:
    encoding a policy update in a virtual machine language used by a virtual machine residing on the device, the virtual machine being operable on the device independently of the components of the device to target policy execution at one or more particular components of the device rather than at an overall computing architecture of the device, by enabling the virtual machine to communicate with the particular components of the device using defined inputs and outputs and without the one or more particular components being within the virtual machine, the virtual machine being deployable on the device agnostic of an underlying operating system; type;
    having the policy update signed by a trusted entity; and
    sending a message comprising the signed policy update to the virtual machine on the device to enable the device to implement the policy update by having the virtual machine on the device execute the policy update and indicate validation of the policy update, wherein the message is configured to be authenticated using a cryptographic scheme.

15. A method of updating an operational policy on a device in a communication system, the method comprising:
    receiving, at a virtual machine residing on the device, a message comprising a signed policy update that has been signed by a trusted entity and configured to be authenticated using a cryptographic scheme, the policy update being encoded in a virtual machine language used by the virtual machine residing on the device, the virtual machine being operable on the device independently of the components of the device rather than at an overall computing architecture of the device, to target policy execution at one or more particular components of the device by enabling the virtual machine to communicate with the particular components of the device using defined inputs and outputs and without the one or more particular components being within the virtual machine, the virtual machine being deployable on the device agnostic of an underlying operating system;
    verifying the signed policy update; and when the policy update is verified, implementing the policy update by having the virtual machine on the device execute the policy update and indicate validation of the policy update.

16. The method of claim 15, wherein verifying the signed policy update comprises considering at least one parameter associated with the device, the at least one parameter being supplemental to information contained in the message.

17. The method of claim 15, wherein the policy update determines whether or not another message should be considered valid.

18. The method of claim 17, wherein the validity of the other message is determined according to any one or more of: a restriction in timeframe, an acceptable sensor range, a geo-location, and a specified sensor or system parameter.

19. The method of claim 15, wherein the policy update causes at least one change to a state of the device.

20. The method of claim 19, wherein the state corresponds to any one of: an acceptance of a new password, an update of logic under which the device will operate, and the provision of new components of data which the device will receive and accept.

21. The method of claim 15, wherein the policy update is included in a digital certificate and the trusted entity is a certificate authority (CA).

22. The method of claim 21, wherein the policy update is included in an extension of a certificate revocation list (CRL).

23. The method of claim 15, wherein the message has been configured to be authenticated by being signed with an asymmetric key cryptographic scheme.

24. The method of claim 23, wherein the asymmetric key cryptographic scheme is an elliptic curve (EC) signature scheme or an RSA signature scheme.

25. The method of claim 15, wherein the message is authenticated with a symmetric-key scheme.

26. The method of claim 15, wherein the message is authenticated with an authenticated encryption scheme.

27. A non-transitory computer readable medium comprising computer executable instructions for updating an operational policy on a device in a communication system, the computer executable instructions comprising instructions for:
receiving, at a virtual machine residing on the device, a message comprising a signed policy update that has been signed by a trusted entity and configured to be authenticated using a cryptographic scheme, the policy update being encoded in a virtual machine language used by the virtual machine residing on the device, the virtual machine being operable on the device independently of the components of the device rather than at an overall computing architecture of the device, to target policy execution at one or more particular components of the device by enabling the virtual machine to communicate with the particular components of the device using defined inputs and outputs and without the one or more particular components being within the virtual machine, the virtual machine being deployable on the device agnostic of an underlying operating system;
verifying the signed policy update; and
when the policy update is verified, implementing the policy update by having the virtual machine on the device execute the policy update and indicate validation of the policy update.

28. A system for updating an operational policy on a device in a communication system, the system comprising a processor and memory, the memory comprising computer executable instructions for:
receiving, at a virtual machine residing on the device, a message comprising a signed policy update that has been signed by a trusted entity and configured to be authenticated using a cryptographic scheme, the policy update being encoded in a virtual machine language used by the virtual machine residing on the device, the virtual machine being operable on the device independently of the components of the device rather than at an overall computing architecture of the device, to target policy execution at one or more particular components of the device by enabling the virtual machine to communicate with the particular components of the device using defined inputs and outputs and without the one or more particular components being within the virtual machine, the virtual machine being deployable on the device agnostic of an underlying operating system;
verifying the signed policy update; and
when the policy update is verified, implementing the policy update by having the virtual machine on the device execute the policy update and indicate validation of the policy update.

29. A method of triggering a policy update for at least one device in a communication system, the method comprising:
detecting an issue or event requiring an operational policy update;
sending a notification to a policy authority to have a policy update generated; and
receiving, at a virtual machine residing on the device, a message comprising a signed policy update that has been signed by a trusted entity and configured to be authenticated using a cryptographic scheme, the policy update being encoded in a virtual machine language used by the virtual machine residing on the device, the virtual machine being operable on the device independently of the components of the device rather than at an overall computing architecture of the device, to target policy execution at one or more particular components of the device by enabling the virtual machine to communicate with the particular components of the device using defined inputs and outputs and without the one or more particular components being within the virtual machine, the virtual machine being deployable on the device agnostic of an underlying operating system, wherein the policy update is implemented by having the virtual machine on the device execute the policy update and indicate validation of the policy update.

30. The method of claim 29, further comprising:
verifying the signed policy update; and
implementing the policy update using the virtual machine on the device when the policy update is verified.

31. A method of updating an operational policy in a communication system, the method comprising:
detecting, at a first device, an issue or event requiring an operational policy update;
determining at least one other device in the communication system to be updated;
encoding a policy update in a virtual machine language used by a virtual machine residing on the at least one other device, the virtual machine being operable on the device independently of the components of the device rather than at an overall computing architecture of the device, to target policy execution at one or more particular components of the device by enabling the virtual machine to communicate with the particular components of the device using defined inputs and outputs and without the one or more particular components being within the virtual machine, the virtual machine being deployable on the device agnostic of an underlying operating system;

having the policy update signed by a trusted entity to enable authentication using a cryptographic scheme; and sending a message comprising the signed policy update to virtual machine on the the at least one other device to enable the at least one other device to implement the policy update by having the virtual machine on the device execute the policy update and indicate validation of the policy update.

* * * * *

UNITED STATES PATENT AND TRADEMARK OFFICE
CERTIFICATE OF CORRECTION

PATENT NO. : 9,774,632 B2
APPLICATION NO. : 14/665733
DATED : September 26, 2017
INVENTOR(S) : Robert Philip Gallant and Robert John Lambert It is certified that error appears in the above-identified patent and that said Letters Patent is hereby corrected as shown below:

In the Claims

In Claim 14, Column 20, Line 39, delete "type;".

Signed and Sealed this
Fifth Day of December, 2017

Joseph Matal
*Performing the Functions and Duties of the*
*Under Secretary of Commerce for Intellectual Property and*
*Director of the United States Patent and Trademark Office*